US 6,634,720 B2

(12) United States Patent
Lopez

(10) Patent No.: US 6,634,720 B2
(45) Date of Patent: Oct. 21, 2003

(54) ROTATABLE WHEEL FOR A WORK MACHINE AND METHOD OF ASSEMBLY

(75) Inventor: Michael A. Lopez, Urbana, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/902,041

(22) Filed: Jul. 10, 2001

(65) Prior Publication Data

US 2003/0011244 A1 Jan. 16, 2003

(51) Int. Cl.⁷ ............................................... B60B 27/02
(52) U.S. Cl. .................................................. 301/105.1
(58) Field of Search ............................. 301/5.1, 105.1, 301/35.621; 384/544, 477; 180/252; 305/136

(56) References Cited

U.S. PATENT DOCUMENTS

| | | |
|---|---|---|
| 2,114,937 A | 4/1938 | Poirier |
| 3,811,732 A | 5/1974 | Walther et al. |
| 4,035,028 A | 7/1977 | Wilcox |
| 4,207,968 A * | 6/1980 | Chamberlain |
| 4,351,568 A | 9/1982 | Ahlschwede |
| 4,385,785 A | 5/1983 | Norris et al. |
| 4,509,239 A | 4/1985 | Liggett |
| 5,757,084 A | 5/1998 | Wagner |
| 5,895,317 A | 4/1999 | Timm |
| 6,095,617 A | 8/2000 | Bertetti |
| 6,109,411 A * | 8/2000 | Bigley |

* cited by examiner

*Primary Examiner*—Russell D. Stormer
(74) *Attorney, Agent, or Firm*—Tom Derry

(57) ABSTRACT

This invention relates to a rotatable wheel for use on a work machine. The wheel is adapted to cooperate with a wet brake assembly being non-rotatably mounted to a spindle, using a plurality of mating splined surfaces. Positioning of wheel bearings in relation to a load line improves performance and life the wheel bearings. A recessed portion of the hub is provided between a wheel mounting flange and brake sealing surface improves life of brake seals.

15 Claims, 3 Drawing Sheets

Fig-3-
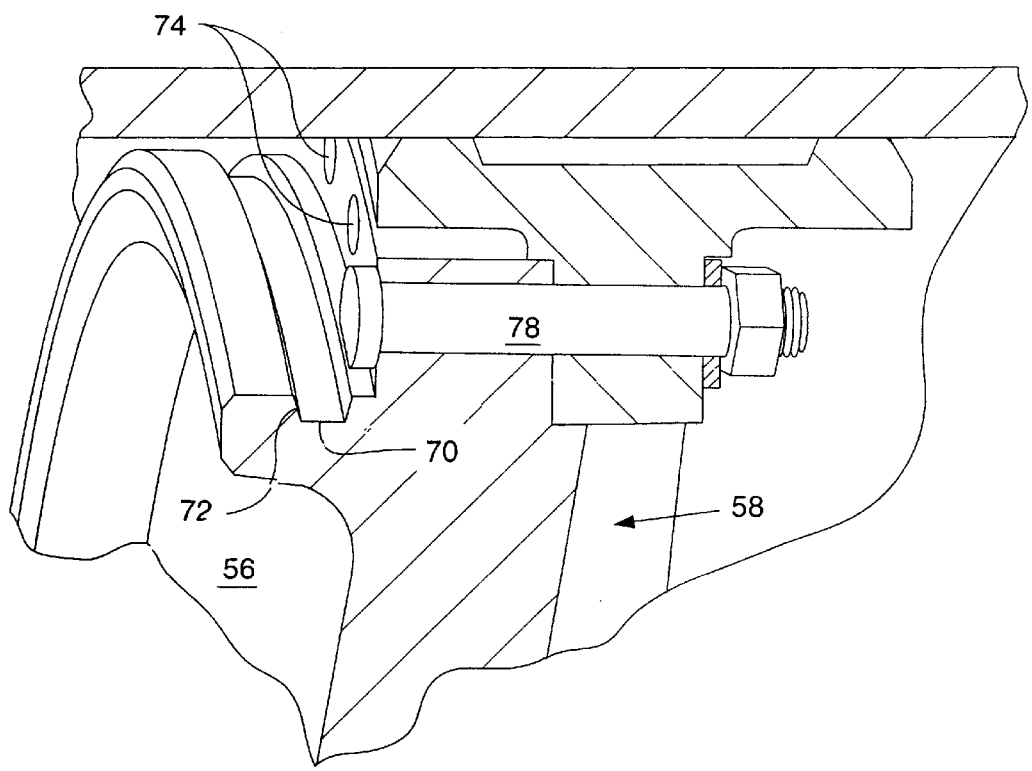
Fig-4-
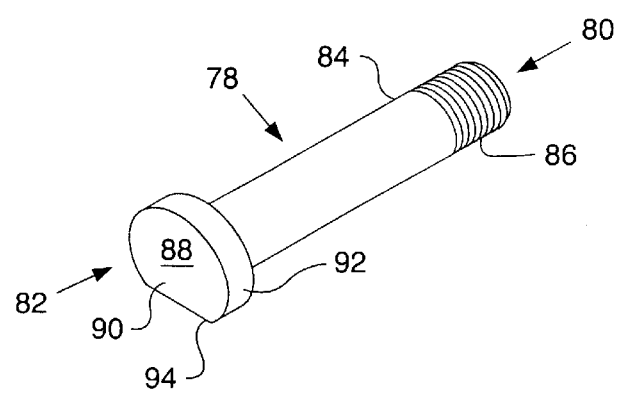

ROTATABLE WHEEL FOR A WORK MACHINE AND METHOD OF ASSEMBLY

TECHNICAL FIELD

This invention relates generally to wheels for use to move work machines about the ground and more particularly to a geometric design for a wheel.

BACKGROUND

Work machines, such as off-highway trucks and wheel loaders, typically have at least a pair of wheels that are rotatably mounted on corresponding axles or spindles. The wheels, when assembled on the work machine, may additionally attach to wet (liquid cooled) brake assemblies and have a rim and tire mounted to the wheel. Such wheels have a hub that defines a cavity for reserving a quantity of bearing lubricant, and a first seal arrangement serves to contain the lubricating oil in the hub. A second sealing arrangement serves to contain the brake coolant in the brake at the position where the non-rotatable portion of the brake interfaces with the rotatable wheel. There are two basic types of forces or loads exerted on the structure of the wheel. The first is an axial force caused by the pre-loading of the wheel bearings. To maximize the life of the wheel bearings, axial should be maintained nearest to the specifications of the bearing manufacturer as possible. Second is a radial force caused by the weight of the machine on each wheel. The radial forces on the wheel tend to be more dynamic and fluctuate greatly due to machine traveling across rough or uneven terrain. Because the rim mounting flange extends from the hub, the radial forces are translated to the hub. Additionally, the positioning of the wheel bearings in relation to the centerline of the load, also referred to as a load line, has a large impact on bearing life. This is particularly true for steerable wheels. For example, if one of the bearings on a steerable wheel is axially positioned near the load line of the wheel, there are higher twisting forces on the bearing than if the same bearing is positioned farther away from the load line.

The geometric design of the wheel may additionally impact the life and functionality of the seals. It is most desirable to have a geometric design including a hub that is substantially cylindrical cross section between the wheel bearings with the rim mounting flange extending outward perpendicular to the hub. The cylindrical hub design translates pre-load forces through the hub primarily through axial force vectors and the radial forces are translated perpendicular to the axial forces. A hub having an oval or angled cross section translates the pre-load and radial forces through a greater combination of axial and radial force vectors, this results in a coupling of the independent pre-load and radial forces. The coupling of the independent forces now causes the critical pre-load become dynamically impacted. As with the design of many structures, the typical design of a wheel permits a predetermined amount of elastic deformation or flexing. It is desirable to permit some flexing of the rim mounting flange in order to minimize flexing near critical elements, such as, sealing surfaces and bearing mounting surfaces.

An additional problem with work machines of this nature is that road conditions at many mine sites throughout the world are extremely bad. Many of the roads are typically constructed of dirt and rocks. Small rocks and debris gets picked up by the tires and may be dropped into the wheels, the rocks and debris may accumulate near seal cavities. Additionally, water is often spayed on the roads to reduce dust. The dirt is therefor turned to mud, and the mud is thrown onto the wheel. A build of debris, mud and rocks near the wheel seals may open or cause damage to the seals. A damaged seal may in turn cause a loss/or contamination of brake coolant or bearing lubrication, resulting in premature mechanical failure of associated components.

The present invention is directed to overcome one or more of the problems described above.

SUMMARY OF THE INVENTION

In one aspect of the present invention, a rotatable wheel for a work machine has a central axis and a cylindrical hub defined about the axis. The hub has an inside surface and an outside surface outwardly spaced from the inside surface. Additionally, the hub has an inboard end and an outboard end opposite the inboard end. Bearing mounting surfaces are located on the inside surface of the hub near the inboard and outboard ends. A first sealing surface is located near the inboard end and adjacent the hub's inner surface. The rotatable wheel comprises a rim mounting flange extending radially outward from the outside surface interposed the inboard and outboard ends, a second sealing surface extends about the hubs outside surface and a recessed portion is located on the outside surface between the mounting flange and the second sealing surface. The recessed portion provides a barrier to keep debris away from the second sealing surface.

In a second aspect of the present invention, is provided a work machine having a plurality of rotatable wheels. The rotatable wheels are adapted for moving the work machine along a surface. Additionally, the work machine has a engine and a drive train. At least one of the rotatable wheels is connected to the drive train. At least one of the rotatable wheels comprises a cylindrical hub with central axis and an inside surface defined about the central axis. An outside surface is spaced outward of the inside surface. An inboard end is defined on the hub and an outboard end is spaced axially away from the inboard end. A bearing mounting surface is located on the inside surface near each of the inboard and outboard ends. A mounting flange extends radially outward from the outside surface. A first sealing surface is positioned inboard and adjacent to the inboard bearing surface. A second sealing surface is positioned between the mounting flange and the inboard end. A recessed portion of the hub is positioned between the mounting flange and the second sealing surface.

BRIEF DESCRIPTION OF THE DRAWINGS

FIG. 3 is a perspective sectional view of a rim attached to the rim mounting flange of a wheel.

FIG. 4 is a perspective view of a stud for attaching a rim to a wheel.

DETAILED DESCRIPTION

Figure 1:
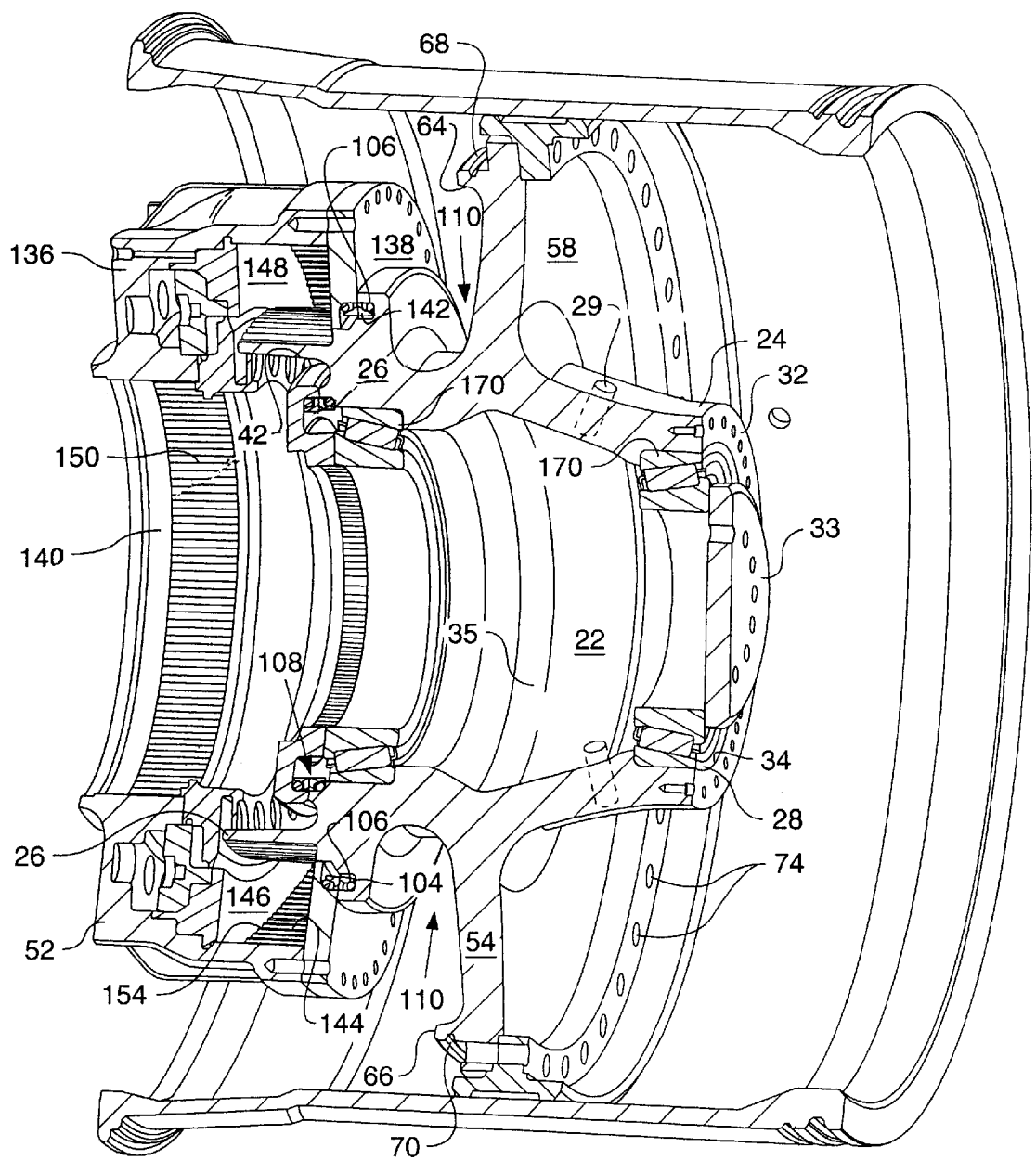
FIG. 1 is a perspective sectional view of the wheel of the present invention.

While the invention is open to various modifications and alternatives, a specific embodiment thereof has been shown by way of example in the drawings and will herein be described in detail.

In the following detailed description of the invention, "inboard" refers to the end or side that is to the left of a load line. The load line extends vertically through the center of a tire, as viewed from the front of a work machine. The term "inboard" additionally corresponds to the end of the wheel that is closest to a longitudinal vertical center plane of the work machine. "Outboard" refers to a side or end that is furthest from the vertical centerline.

FIG. 1 illustrates a rotatable wheel 10 having a typical cylindrical rim 12 fastened thereon. The rim 12 is adapted for having a tire (not shown) mounted on an exterior surface 14 of the rim 12. The rotatable wheel 10 is typically manufactured from a casting. The casting is machined to the manufacturers specified dimensions using conventional machining techniques.

The wheel 10 is defined about a central axis 16 that extends horizontally through the wheel 10 and the load line 18 that extends vertically through the wheel 10. The load line 18 is defined relative to the axial center of a tire (not shown) as the tire would be viewed mounted on the rim 12. The wheel 10 has a cylindrical hub 20 disposed about the central axis 16. The hub 20 has an inside surface 22 at a distance radially outward of the central axis 16. An outside surface 24 is disposed on the hub 20 at a distance radially outward of the inside surface 24. The hub 20 further defines an inboard end 26 and an outboard end 28 opposite of the inboard end 26. A threaded hole 29 extends from the inside surface 22 to the outside surface 24 at a location near the outboard end 26 of the hub 20. The threaded hole 29 is adapted to engage a plug (not shown). The outboard end 26 of the hub 20 has a flat surface 30 with a pattern of threaded holes 32 radially spaced about the flat surface 30. The flat surface 30 also includes a circular groove 34 that is adapted to receive an o-ring (not shown). An inboard bearing mounting surface 36 and an outboard bearing mounting surface 38 are defined on the inside surface 22 of the hub 20. The outboard bearing surface 38 is located adjacent the outboard end 28 of the hub 20 and an inboard bearing surface 36 is located adjacent the inboard end 26 of the hub 20. A first distance d1 is representative of the distance from the load line 18 to the outboard bearing mounting surface 38. A second distance d2 is representative of the distance from the load line 18 to the inboard mounting surface.

The inboard end 26 of the wheel 10 includes a rotatable disk anchor portion 40. The rotatable disk anchor portion 40 has an inner annular portion 42. An outside surface 46 of the rotatable disk anchor portion 40 is defined opposite the inside surface 44. The outside surface 46 includes a plurality of parallel splines 48 spaced radially about the outside surface 46. The splines 48 are oriented in an axial direction about the inside surface. The splines 48 are adapted to engage a plurality of rotatable disks (not shown) for a wet brake assembly 52.

A rim mounting flange 54 extends radially outwardly from the outside surface 24 of the hub 20. The rim mounting flange 54 is interposed the inboard end 26 and the outboard end 28 of the hub 20. The rim mounting flange 54 defines an inboard surface 56 and an outboard surface 58. The outboard surface is 58 spaced at an axial distance outboard of the inboard surface 56. An outer edge 60 is defined surface 58. A circular raised portion 62 of the rim mounting flange 54 extends inwardly from the inboard surface 56. The raised portion 62 is coaxial with the central axis 16 of the hub 20. The raised portion 62 is located near the outer edge 60 of the rim mounting flange 54. The raised portion 62 has a first surface 64 that faces the hub 20, a second surface 66 facing away from the hub 20 and a third surface 68 joining the first and second surfaces 64,66. A ring groove 70 is defined about the second surface 66 and adapted to receive a snap ring (not shown).

A plurality of holes 74 are disposed on, and extend axially through the rim mounting flange 54. The plurality of holes 74 are radially spaced a predetermined distance 76 about the central axis 16 of the hub 20. The each one of the plurality of holes 74 is adapted to receive a stud 78. The studs 78 are cylindrical fasteners having a first end 80, a second end 82 and an outer surface 84 therebetween. The outer surface 84 of the studs 78 include a threaded portion 86 that extends from the first end 80 toward the second end 82. The second end 82 of the studs 78 have a head 88 defined thereon. The heads 88 of the studs 78 are larger in diameter than the holes 74 in the rim mounting flange 54. The heads 88 of the studs 78 include a top surface 90 and an edge surface 92 adjacent to the top surface 90. A flat portion 94 is defined on the edge surface 92. Each stud 78 is adapted to be inserted into one of the plurality of holes 74. Each stud 78 is positioned into its respective hole with the flat portion 94 of the head 88 positioned adjacent to the second surface 66 of the raised portion 62. The stud 78 is further inserted until the head 88 of the stud 78 contacts the inboard surface 56 of the rim mounting flange 54. The threaded portion 86 of the stud 78 protrudes through the outer surface 56 of the rim mounting flange 54. The snap ring 72 is positioned into the ring groove 70 to hold the stud.

The wheel 10 of the present invention further includes a first and second brake sealing portion 96,97. The first brake sealing portion 96 is defined by a raised portion 98 that extends radially outward from the outside surface 24 of the hub 20 at an axial location interposed the rotatable disk anchor 40 and the rim mounting flange 54. The first brake sealing portion 96 includes an inboard facing surface 98 and an outboard facing surface 100 opposite the inboard facing surface 98. An outer edge 102 of the brake sealing portion 96 joins the inboard facing surface 98 and the outboard facing surface 100. A circular sealing surface 104 is defined about the inboard facing surface 98 of the brake sealing portion 96. The circular sealing surface 104 is defined coaxial with the central axis 16 of the hub 20. The circular sealing surface 104 is adapted to engage a rubber toric 106 of a duo-cone face seal 108. The second brake sealing portion 97 is disposed on the inboard end 26 adjacent the inside surface of the hub 20. Other types of commonly known face seals may be interchanged with a duo-cone seal.

A recessed portion 110 extends about the outside surface 24 of the hub 20. The recessed portion 110 is interposed the brake sealing portion 96 and the inboard surface 56 of the rim mounting flange 54. The recessed portion 110 is coaxial with the central axis 16 of the hub 20 and has an inside diameter 112 that is less than the outside diameter of the first brake sealing portion 96.

Figure 2:
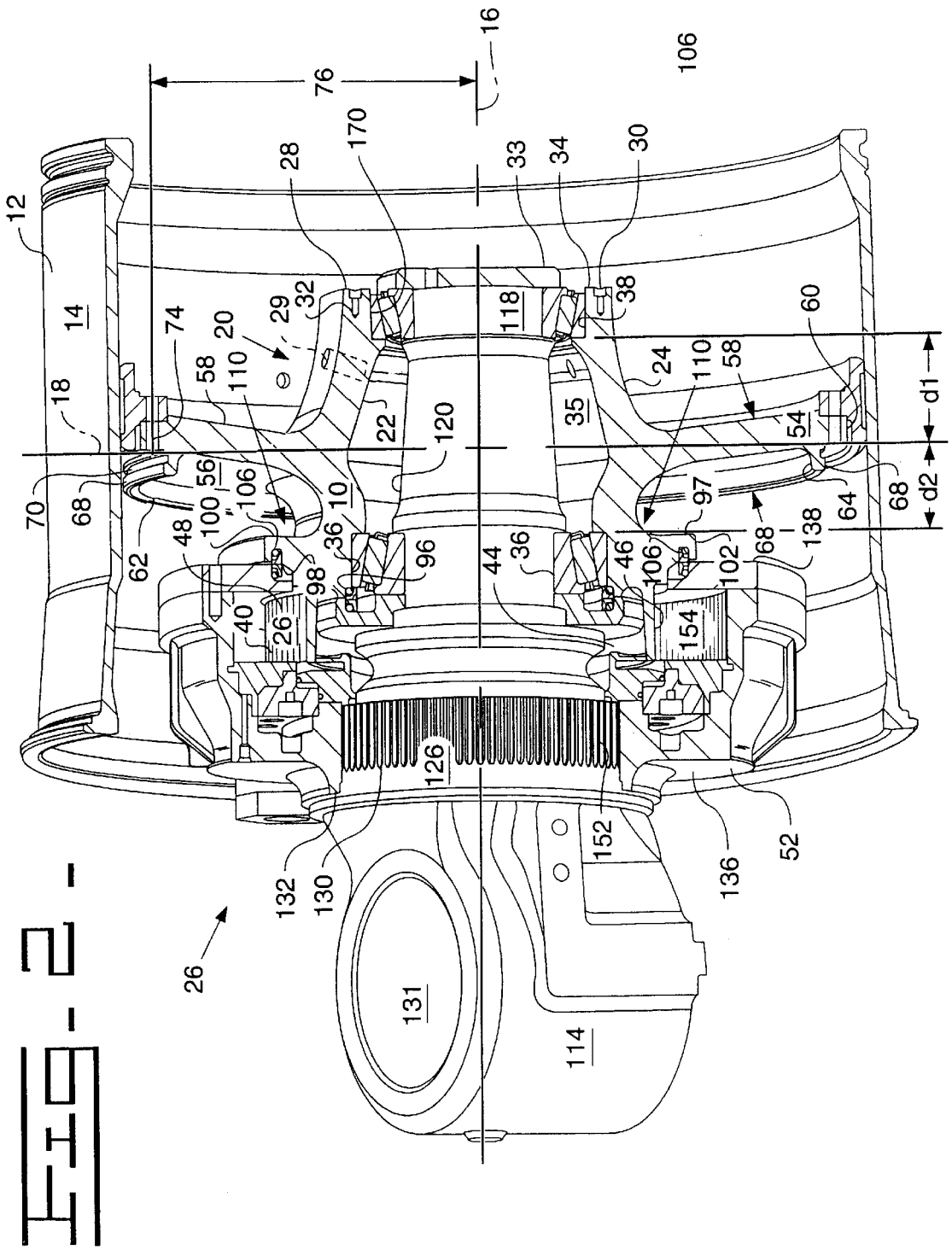
FIG. 2 is a perspective sectional view of a front spindle for an off highway truck having a wet brake and the wheel of the present invention assembled thereon.

FIG. 2 illustrates the rotatable wheel 10 of the present invention having a rim 12 attached thereon. Additionally, the rotatable wheel 10 is shown assembled on a steerable spindle 114 assembly as used on large off-highway trucks. The spindle and wheel 10 assembly further includes a wet brake assembly 52 non-rotatably engaging the spindle 114 and rotatably engaging the wheel 10.

The spindle 114 is defined about the central axis 16 and has a outboard end 116 and an inboard end 118 disposed opposite the outboard end 116. An outer surface 120 is defined about the inboard end 118 of the spindle 114 and spaced a distance outward from the central axis 16. An outboard bearing surface 122 is defined on the outer surface 120 adjacent the outboard end 116. An inboard bearing surface 124 is defined inboard of the load line 18 on the outer surface 120 of the spindle 114. A large diameter portion 126 with an outside circumferential surface 128 is defined inboard of the inboard bearing surface 124. The large diameter portion 126 of the wheel 10 spindle has a series of parallel splines 130 about the outside circumferential surface 128. The inboard end 118 of the spindle 114 has a bore 131 disposed in a substantially vertical orientation. The bore 131 is adapted to receive one end of a strut (not show) of a suspension system of a work machine.

The wet brake assembly 52 includes a non-rotatable member, or brake anchor 132, and a plurality of brake disks (not shown). The brake anchor 132 defines a substantially cylindrical member having an inboard end 136, an outboard end 138 and a cylindrical inner portion 140 that extends from the inboard end 136 to the outboard end. The outboard end 138 of the brake anchor 132 defines a sealing surface 142 for engaging a rubber toric 106 of a duo-cone seal 108. The inner portion 140 of the brake anchor 132 defines a first inner surface 142 adjacent the inboard end 138 and a second inner surface 144 adjacent the outboard end 138. A cavity 146 is defined between the first inner surface 142 and the second inner surface 144. A plurality of radially inwardly extending splines 150 are disposed about the first inner surface 142 of the brake anchor 132. The splines 150 are adapted to mate with a plurality of radially outwardly extending splines 152 disposed on the large diameter portion 126 of the spindle 114. The second inner surface 144 of the brake anchor 132 is of a larger diameter that the first inner surface 142. A plurality of radially inwardly facing splines 154 are disposed about the second inner surface 144 of the brake anchor 132. The cavity 146 serves as a housing for typical working components of the wet brake assembly 52 and will not be discussed in detail.

The brake disks of the brake assembly 52 include a plurality of non-rotatable disks (not shown) and a plurality of rotatable disks. The non-rotatable disks and the rotatable disks include a first side, a second side, an inner circumference and an outer circumference. The outer circumference of the non-rotatable disks includes a series of teeth spaced evenly thereabout. The plurality of teeth on the non-rotatable disks are adapted to engage the splines of the second inner surface 144 of the of the brake anchor 132. A plurality of teeth are defined about the inner circumference of the rotatable disks. The plurality of teeth on the rotatable disks are adapted to engage the splines 48 on the wheel 10. The rotatable disks and non-rotatable disks are assembled into the brake assembly 52 in alternating order.

INDUSTRIAL APPLICABILITY

The construction and geometric design of the rotatable wheel 10 of the present invention provides several advantages over those previously known in the art. More particularly, the second brake sealing surface 97 defines a barrier, for debris falling from the area of rim mounting flange 54. The majority of debris that may build up is likely to be in the recessed portion 110. For example, during dynamic loading of the wheel 10 the rim mounting flange 54 is permitted to flex, without the second brake sealing surface 97. Additionally, debris and dirt falling from the inboard surface 56 of the rim mounting flange 54 tends to drop into the recessed portion, thus reducing debris build up in the area of the duo-cone seal 108. The substantially cylindrical hub 20 design isolates axial pre-load and dynamic radial loading, thus maintaining the predetermined pre-load and extending life of the wheel bearings.

The use of the brake anchor 132 having a splined mating surface 150 to engage the spindle 114, allows the spacing of the inboard bearing surface 124 to be moved farther inboard in relation to the load line 18. The greater distance inboard of the load line 18, reduces twisting forces on the wheel bearings.

Usage of studs 78 as described for fastening a rim 12 to the hub 20 simplifies replacement of studs 20. To replace the stud 78 the snap ring 72 is removed from the ring groove 70, the stud 78 can be easily pushed to the inboard end 26 of the hub 20. New studs 78 are simply inserted into the holes 74 with the flat portion 94 aligning with the raised portion 62 of the rim mounting flange 54, the snap ring 72 is positioned back into the ring groove 70 to hold the studs 78 in their respective holes 74. During loosening or tightening of nuts from the studs 78, the studs 78 are prevented from turning due to the engagement of the flat portion 94 with the second surface 66 of the raised portion 62 of the rim mounting flange 54.

What is claimed is:

1. A rotatable wheel for a work machine, said wheel having a central axis, a cylindrical hub defined radially about said central axis, said hub having an inside surface and an outside surface outwardly spaced from said inside surface, an inboard end and an outboard end opposite said inboard end, a bearing mounting surface located on said inside surface of said hub near each of said inboard and outboard ends, a first sealing surface near and extending about said inboard end adjacent to said hub's said inside surface, said rotatable wheel comprising:
   a rim mounting flange extending radially outward from said outside surface and interposed said inboard and said outboard ends;
   a second sealing surface extending about said hub's outside surface nearest said inboard end; and
   a recessed portion about said outside surface of said hub being located between said rim mounting flange and said second sealing surface, wherein said recessed portion provides a barrier reducing debris build up near said second sealing surface.

2. The rotatable wheel of claim 1 including a vertically extending load line, said load line being defined by the center vertical center line of a tire mounted on said rim, said outboard bearing mounting surface being positioned at a first distance outboard from said load line and said inboard bearing mounting surface being positioned at a second distance inboard from said load line, said second distance being not less than sixty five percent of said first distance of said outboard bearing mounting surface.

3. The rotatable wheel of claim 2 wherein said vertically extending load line is located substantially adjacent said inboard surface of said rim mounting flange.

4. The rotatable wheel of claim 1 including a brake disk anchor positioned substantially adjacent the second sealing surface.

5. The rotatable wheel of claim 4 wherein said brake disk anchor includes a plurality of splines positioned about the outside surface of said hub.

6. The rotatable wheel of claim 4 wherein said brake disk anchor is integral said hub.

7. The rotatable wheel of claim 4 wherein said brake disk anchor is removably coupled to said hub.

8. The rotatable wheel of claim 1 wherein said wheel is a driven wheel.

9. The rotatable wheel of claim 1 wherein said wheel is adapted for steering a work machine.

10. The rotatable wheel of claim 1 including an end cap positioned over outboard end of said hub, wherein an oil reservoir is defined by a cavity located between the end cap and said first sealing surface.

11. The rotatable wheel of claim 10 including an opening in said end cap, said opening being adapted to engage a plug and said opening being positioned relative to a desired normal fill level of a bearing lubricant.

12. The rotatable wheel of claim 10 including an hole extending through from said inside surface to said outside surface of said hub, said hole being adapted to engage a plug, said hole acting as a lubricant fill when said hole is positioned upwardly, and said hole acting as a lubricant drain when said hole is positioned downwardly.

13. The rotatable wheel of claim 1 wherein said at least one of said first and second sealing surfaces are adapted for engagement with a duo-cone seal.

14. The rotatable wheel of claim 1 wherein said wheel is machined from a casting.

15. A work machine having a plurality of rotatable wheels adapted for moving said work machine along a surface, said work machine additionally having an engine connected to a drive train, wherein at least one of said rotatable wheels is connected to said drive train; at least one of said rotatable wheels comprising:

a cylindrical hub having a central axis, an inside surface defined about said central axis, an outside surface outwardly spaced from said inside surface, an inboard end and outboard end space axially from said inboard end, a bearing mounting surface located on said inside surface near each of said inboard and outboard ends;

a rim mounting flange extending radially outward from said outside surface and positioned substantially between said inner end and said outer end;

a first sealing surface positioned inboard and adjacent of the inboard bearing mounting surface;

a second sealing surface positioned between said rim mounting flange and said inboard end, said second sealing surface being of a larger diameter than that of said first sealing surface; and a recessed portion of said hub being positioned between said rim mounting flange and said second sealing surface.

* * * * *